United States Patent
Dong et al.

(10) Patent No.: US 10,232,267 B1
(45) Date of Patent: *Mar. 19, 2019

(54) FACILITATING MAP NAVIGATION IN AN ONLINE GAME

(71) Applicant: Electronic Arts Inc., Redwood City, CA (US)

(72) Inventors: Ben Dong, Beijing (CN); Jun Yu, Beijing (CN)

(73) Assignee: Electronic Arts Inc., Redwood City, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/695,977

(22) Filed: Sep. 5, 2017

Related U.S. Application Data

(63) Continuation of application No. 14/106,345, filed on Dec. 13, 2013, now Pat. No. 9,751,005.

(51) Int. Cl.
A63F 13/30 (2014.01)
A63F 13/5378 (2014.01)
A63F 13/92 (2014.01)
A63F 13/35 (2014.01)
A63F 13/5252 (2014.01)
A63F 13/65 (2014.01)

(52) U.S. Cl.
CPC .......... A63F 13/5378 (2014.09); A63F 13/35 (2014.09); A63F 13/5252 (2014.09); A63F 13/65 (2014.09); A63F 13/92 (2014.09)

(58) Field of Classification Search
CPC ...... A63F 13/12; A63F 13/5378; A63F 13/92; A63F 13/35; A63F 13/5252
See application file for complete search history.

(56) References Cited

U.S. PATENT DOCUMENTS

| | | | |
|---|---|---|---|
| 6,388,688 B1 | 5/2002 | Schileru-Key | |
| 6,580,441 B2 | 6/2003 | Schileru-Key | |
| 7,467,356 B2 | 12/2008 | Gettman | |
| 8,303,410 B2 | 11/2012 | Chao | |
| 2006/0212824 A1 | 9/2006 | Edenbrandt | |
| 2012/0142429 A1* | 6/2012 | Muller | A63F 13/45 463/42 |
| 2013/0116046 A1 | 5/2013 | Manton | |
| 2013/0151146 A1 | 6/2013 | Syed | |
| 2014/0267015 A1* | 9/2014 | Saatchi | G09G 5/006 345/156 |

* cited by examiner

Primary Examiner — Robert T. Clarke, Jr.
Assistant Examiner — Thomas H Henry
(74) Attorney, Agent, or Firm — Knobbe, Martens, Olson & Bear, LLP

(57) ABSTRACT

A system and method for facilitating navigation of a map in an online game are disclosed. A navigation mode may be provided to enable user to navigate the map by specifying a type of map features of interest to the user. In such a navigation mode, the user may provide directional control input for navigating the map to a map feature having a map feature type associated with the navigation mode; and the field of view of the map may jump from the present field of view to a new field of view corresponding to the map feature. The map feature may be selected because it is closer to a current location where the present field of view is taken in the direction indicated by the control input provided by the user than any other map features having the map feature type.

18 Claims, 5 Drawing Sheets

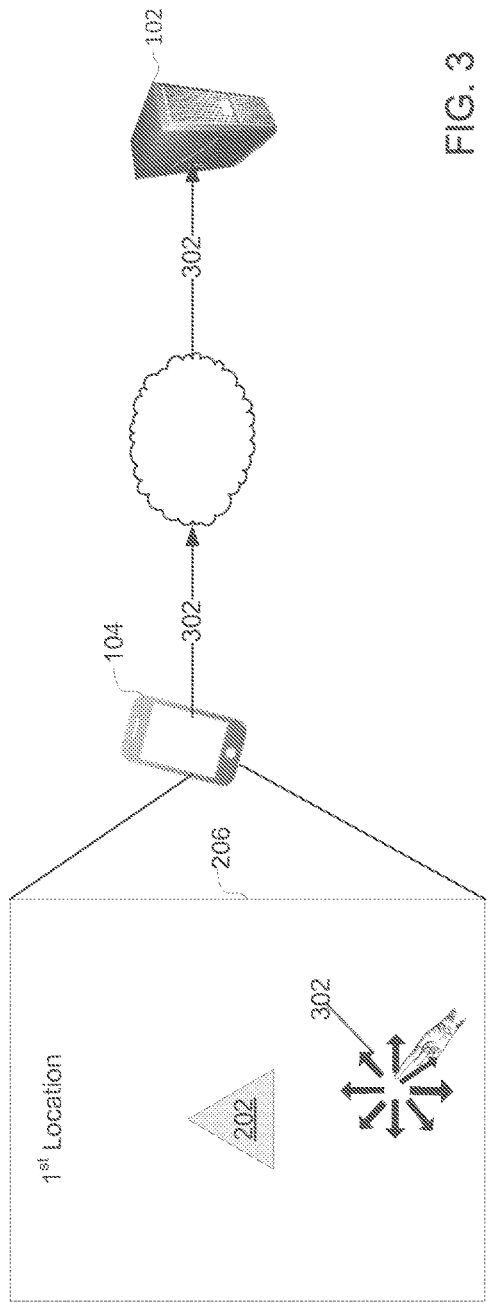
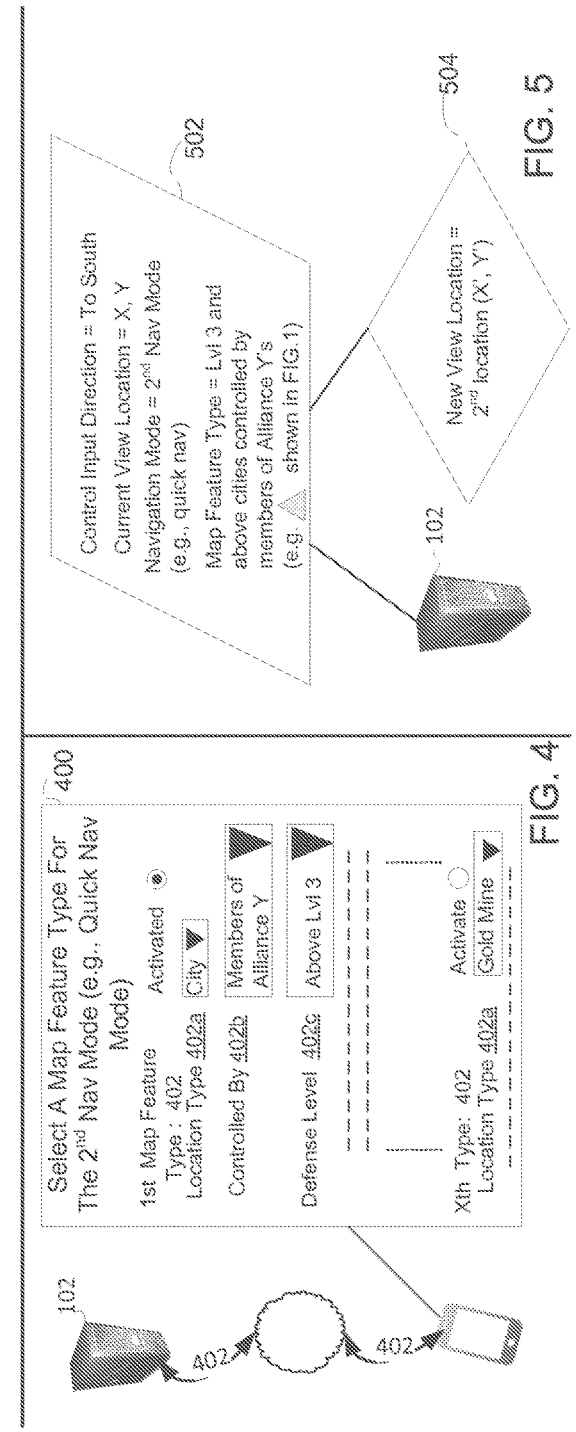

FACILITATING MAP NAVIGATION IN AN ONLINE GAME

FIELD OF THE DISCLOSURE

This disclosure relates to facilitating map navigation in an online game, the map navigation being facilitated by determining a field of view for presentation to a user based on map features of interest to the user.

BACKGROUND

Systems that host virtual spaces are known. In some of those systems, maps of the virtual space may be presented to users for facilitating user interactions with the virtual space. The users of those systems are typically enabled to navigate the maps by providing navigational inputs, such as mouse clicking or dragging for displaying portions of the maps on computers associated with the users. In response to the navigational inputs provided by the users, those systems typically incrementally move the views of the maps by "scrolling" some portions of the maps out of the displays and some other portions of the maps into the displays in accordance with the navigation inputs. For example, in response to a mouse click on a location of a visible portion of a given map being presented to the user on a display, those systems will "scroll" the given map to present that location of the map on the display. In this way, those systems enable the users to navigate the maps of the virtual space in a sliding manner.

SUMMARY

One aspect of the disclosure relates to enabling a user to navigate a map of a virtual space in an online game such that the user may navigate the map by jumping from a present field of view to a new field of view of interest to the user. A navigation mode may be provided to enable user to so navigate the map by specifying a type of map features for association with the navigation mode. In such a navigation mode, the user may provide directional control input, such as a finger swipe or any other directional control input for navigating the map to a map feature having the map feature type associated with the navigation mode as specified by the user. Responsive to receiving such a directional input from the user, the field of view of the map may jump from the present field of view to a new field of view corresponding to a map feature having the map feature type. In some implementations, such a map feature may be selected for presentation to the user because it is closer to a current location where the present field of view is taken on the map in the direction indicated by the control input provided by the user than any other map features having the map feature type. In contrast to the conventional systems described above, this may enable the user to quickly navigate to a feature on the map of interest to the user without having to "scroll" the map. This may enhance user experience with the online game as the user may be enabled to navigate to map features of interest by simply providing directional inputs.

A system configured for facilitating map navigation in an online game may include a server. The server may operate in a client/server architecture with one or more client computing platforms. The client computing platforms may be associated with the users of the virtual space. The server may include a processor configured to execute computer readable instructions to implement system components. The system components may include one or more of a map component, direction control component, navigation mode component, a field of view determination component, and/or other system components.

The map component may be configured to facilitate interaction of a user with a map of a virtual space in an online game by generating a view of the map for presentation to the user. The map may show map features representing locations of the virtual space in terms of their respective forms, shapes, sizes, surrounding conditions, topography, spatial relationships, and/or other aspects associated with the map features. In some examples, the map may show 2D or 3D concepts of such map features using Cartesian coordinate system. Examples such map features may include, but not limited to, towns, cities, castles, states, countries, nations, tribes, realms, kingdoms, rooms, regions, areas, planets, water bodies, islands, stars, and/or any other types of locations in the virtual space; resource cores in the virtual space; locations having specific terrain types in the virtual space; infrastructures, e.g., roads, railroads, buildings, plantations, farms, watch towers, defensive towers, defensive works such as trenches, mines, walls and/or any other defensive works; virtual space characters, objects, or items corresponding to specific locations on the map (e.g., troops in a battle ground, virtual space characters in an area, virtual items available at a location); and/or any other types of map features that may be shown on the map of virtual space.

The user interaction with the map as facilitated by the map component may include zooming in or out of portions of the map, viewing information regarding features shown on the map, moving field of view of the map for viewing different portions of the map, changing an orientation of the map, changing a viewing perspective of the map (e.g., bird's eye view or side view), searching for features on the map, selecting feature density shown on the map, selecting 2D or 3D viewing of the map, initiating virtual space actions, interacting with other users in the virtual space, and/or any other user interactions with the map. For facilitating such user interaction with the map, the map component may generate a view of the map for presentation to the user on the client computing platform. Such a view of the map may correspond to a portion of the map; and may include a zoom ratio, a feature density level, a visibility, a dimensionality, a size and/or any other parameters for adjusting the presentation of the features shown on the portion of the map, a point-of-view, an orientation, and/or other map view parameters. Such a view of the map may be presented on client computing platform such that the user may observe a portion of map that falls within a field of the view of the map.

The direction control component may be configured to receive control inputs provided by the user, which may indicate a direction in which the field of view of the map should be moved. The control inputs may be provided by users using client computing platform and/or control devices coupled to or associated with the client computing platform by performing actions. The actions performed by the user for providing the directional control inputs through the client computing platform and/or control devices may cause the client computing platform and/or control devices to generate output signals. The direction control component may analyze such output signals for determinations of the control inputs provided by the user. Such a determination may include a determination of directions in which the field of view of the map should move as indicated by the control inputs provided by the user.

The navigation mode component may be configured to obtain selection and/or entry of a navigation mode by the user for implementation as a present navigation mode. The navigation mode obtained by the navigation mode component may correspond to a manner of map navigation, e.g., changing the field of view of the map for presentation to the user. The navigation mode obtained by the navigation mode component may include a first navigation mode. In the first navigation mode, the map may be navigated incrementally in response to directions indicated by the control inputs provide by the user. The navigation mode obtained by the navigation mode component may include a second navigation mode. The second map navigation mode may be associated with a type of map features on which the map navigation in the second navigation mode may be based. Unlike in the first navigation mode, in the second navigation mode, the navigation of the map may not cause portions of the map between a first location and a second location to be moved into the field of the view continuously in a "scrolling" manner, but rather switch the field of view of the map from the present field of view to a new field of view in a "jumping" manner instantly or near-instantly.

A given type of map features associated with the second navigation mode may be defined or specified by one or more map feature parameters, which may include, but not limited to, a location level threshold parameter, a user type parameter, a feature level threshold, a defense level threshold parameter, a size threshold parameter, a population threshold parameter, a resource threshold parameter for defining the map feature type, and/or any other map feature parameters. Such map feature parameters may be used to specify map features of interest to the user, which may include, but not limited to, cities, kingdoms, realms, towns, resource cores, rooms, fields, battle grounds, landmarks, planets, stars, oceanic locations and/or any other types of virtual space locations.

The location parameters may include a user type parameter that may be used to specify map features associated with a type of users of interest to the given user. The user type for such specification may include user type by a relationship with respect to the given user. The location parameters may include a feature level parameter for specifying the map feature type associated with the second navigation mode. The location parameters may include threshold parameters for specifying the type of map features associated with the map. Such threshold parameters may include a defense level threshold parameter, a size threshold parameter, a population threshold parameter, a resource threshold parameter, a production threshold parameter, a troop threshold parameter, and/or any other threshold parameters for specifying the map feature type associated with the second navigation mode.

In some implementations, the navigation mode component may be configured to facilitate users to provide the map feature type to be associated with the second navigation mode through a user interface implemented on the client computing platform.

In some implementations, the navigation mode component may be configured to determine a number of map feature parameters available to the user for the user to specify the map feature type associated with the second navigation mode in the user interface. In some implementations, the navigation mode component may be configured to facilitate an offer of one or more feature parameters to the user in exchange for virtual consideration in graphical user interface.

The field of view determination component may be configured to determine a field of view of the map for the user in response to a control input provided by the user indicating a direction in which the field of view should be moved. The determination of the present field of the view by the field of view determination component may include a determination of a new location where the present field of view should be taken on the map. The determination of such a new location may be based on the current location where the present field of view is taken, the control input provided by the user, the navigation mode selected by the user and/or any other parameters. When the second navigation mode is selected by the user, for determining the new field of view, the field of view determination component may first compose a query for acquiring map features that are of interest to the user as indicated by the map feature type associated with the second navigation mode. Upon receiving a result set or results a query (e.g., from the virtual space location database), field of view determination component may be configured to parse the result set(s). The obtained result set(s) may include locations shown as map features having the map feature type associated with the second navigation mode. In some implementations, the field of view determination component may be configured to select a location corresponding to a first map feature shown on the map from the result set(s). The field of view determination component may select the first map feature because the first map feature is closer to the current location where the present field of view is taken in the direction indicated by the control input than any other map features included in the result set(s), i.e., other map features having the map feature type.

In some implementations, the field of view determination component may be configured to obtain a reference location from which the navigation of the map in the second navigation mode may be initiated. In some exemplary implementations, the field of view determination component may be configured to determine a level of accuracy of the new location to be presented in the present field of view in the second navigation mode. In some exemplary implementations, the field of view determination component may be configured to exhaust an amount of resource in a user's inventory for determination of present field of view in the second navigation mode.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates one example of control inputs provided by a user through finger swipe on a touch sensitive surface employed by the system shown in FIG. 1.

FIG. 4 illustrates one example a user interface for specifying a map feature type for association with the navigation mode.

FIG. 5 depicts one example of determining a new location on the map where the present field of view should move to in response to a control input provided by the user in the second navigation mode.

DETAILED DESCRIPTION

Figure 1:
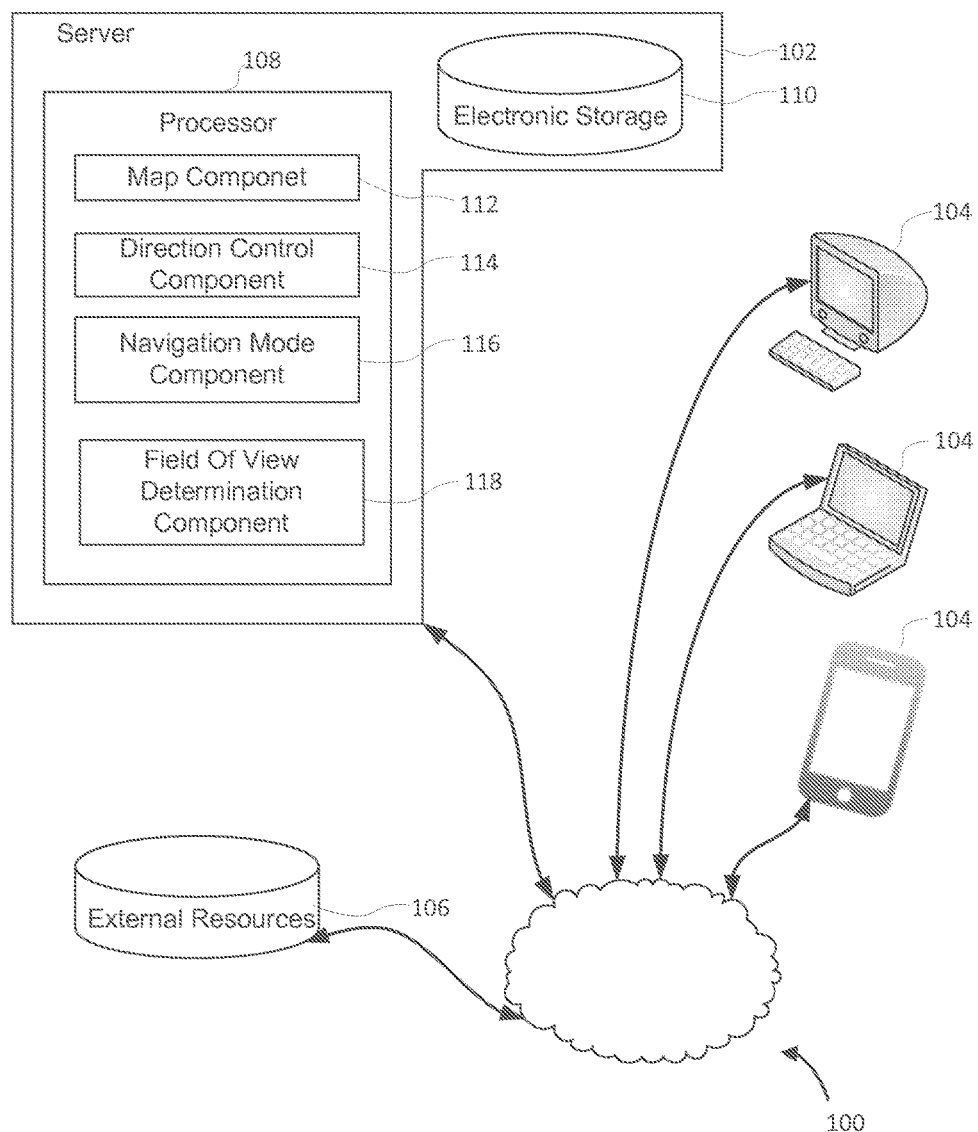
FIG. 1 illustrates one example of a system for facilitating users to obtain information regarding locations within a virtual space in accordance with the disclosure.

FIG. 1 illustrates a system 100 for facilitating users to navigate a map of a virtual space in an online game in accordance with the discloser. Providing the virtual space may include hosting the virtual space over a network. In some implementations, system 100 may include a server 102. The server 102 may be configured to communicate with one or more client computing platforms 104 according to a client/server architecture.

The users may access system 100 and/or the virtual space via client computing platforms 104. The server 102 may comprise a processor 108 configured to execute computer readable instructions to implement system components. The system components may include one or more of a map component 112, a direction control component 114, a navigation mode component 116, a field of view determination component 118, and/or other system components.

The map component 112 may be configured to facilitate interaction of a user with a map of a virtual space in an online game by generating a view of the map for presentation to the user. The online game may provide gameplays, which may include, without limitation, role-playing, first-person shooter, real-time strategy, turn-based strategy, simulation, music or rhythm playing, social interaction, twitching and/or any other gameplays. The online game may facilitate the user to engage in such gameplays through simulating a virtual space representing a game world. The simulated virtual space may be accessible by the user via clients (e.g., client computing platforms 104) that present the views of the virtual space to the user. The simulated virtual space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein).

Within the virtual space provided by the online game, the user may control virtual space locations to generate revenues, productions, resources, troops, culture, wonders, special units and/or any other types of output enabled by the virtual space locations controlled by the users. The user controlled locations may include virtual space towns, cities, kingdoms, castles, villages, fortresses, land masses, resource cores, and/or any other types of virtual space locations. Typically, through the controlling of such virtual locations, the users may grow populations, construct infrastructures, conduct commerce, collect taxes, raise troops, train special units, train knights and/or any other user characters, research technologies, gain skills and/or abilities, and/or undertake any other actions, functions, deeds, sphere of actions as enabled by such virtual space locations. For example, a given user may control multiple cities in the virtual space and the cities may generate revenues to fund the given user activities within the virtual space; may generate troops for defending the cities or attacking other elements in the virtual space; may generate growth in science through research institutes established in those cities; may produce weapons through arsenals established in those cities; may generate production through factories established in those cities; may produce food through farms in those cities and so on.

A given location controlled by the user, such as a city may be associated with one or more aspects manifested in the virtual space. Such aspects about the given user controlled location may reflect a state of the location. Examples of such aspects may include a general status associated with the location (e.g., beginner protection such that other users may not attack a location with such a status, normal, truce such that other users may not attack a location with for a period and/or any other status), a defense level indicating defensive strength or an amount of damages that may be resisted by the given location, a number of troops associated with the location (e.g., stationed in or around the location), types of the troops associated with the location, resources associated with the location, food supply produced by the location, production by the location (e.g., an amount of production output by the location), terrain types associated with the location, one or more buildings associated with the location (e.g., located within the location), and/or any other aspects that may be associated with the location.

Within the virtual space provided by the online game, the user may control resource cores in the virtual space to acquire resources required for engaging in various activities or actions within the virtual space. A resource core is a type of virtual space object that may provide the user specific raw materials, resources, currencies, substances, and/or any other virtual space elements at a rate, e.g., 100 coals/second, 50 timber/turn, or any other rate. At a given time, a quantity of resources remaining in a resource core may be known in the virtual space—for example, 100,000 coals left in a coal mine to be mined or 50,000 gold left in a gold mine to be collected, just for illustrations. Resource cores may be depleted due to harvesting actions by users and in some examples may be destroyed in the virtual space. In some examples new resource cores may be created to replace the destroyed ones in the virtual space at times determined by the provider, administrator, moderator, and/or any other entities related to the virtual space. Examples of resource cores may include mines, rivers, wells, oceans, swamp, mountains, forests, boxes, pets, plants, and/or any other virtual space locations or objects.

Within the virtual space provided by the online game, the user may control characters to engage in battles. The battles engaged in by the user may include battles against other players (e.g. PvP battles), against AI controlled entities, objects, and/or any other entities in the environment of the virtual space (e.g., PvE battles), and/or any other types of battles. To facilitate such battles, the online game may enable the user to perform combat actions. The combat actions may include real-time combat actions through which the users may direct user entities (e.g., avatars) to perform maneuvers in real or near-real time; may include turn-based combat actions through which the users may direct user entities (e.g., user character, troops and/or combat equipment) to inflict damages and/or resist damages; may include strategy combat actions through which the users may position the user entities strategically in combats; and/or may include any other types of combat actions. A given battle in the virtual space may correspond to a location in the virtual space where the given battle takes place. As used herein, such a location is referred to as a "battle location".

Within the virtual space provided by the online game, the user may be enabled to form various relationships with other users of the online game. The relationships formed by the user may facilitate the user to engage in, without limitation, social, competitive, cooperation, collaboration, diplomatic, roleplaying and/or any other types of interactions with other users. Examples of such relationships may include, but not limited to, alliance, collaboration, competition, cooperation, negotiation, team play, team development, trading, social organization, bluffing, and/or any other relationships. For example, the user may form alliance relationships with other uses such that the user agrees to obey particular and specific alliance rules, conducts towards those users. For instance, the user may be enabled to transport troops to cities controlled by alliance members for defending those cities; may be enabled to transfer resources to alliances members via virtual storage (e.g., a warehouse associated with the alliance); may be enabled to team up with alliance members to engage in battles against members of alliance(s) opposing to the alliance the user belongs to; and/or any other types actions enabled by virtue of the user's membership in the alliance.

For facilitating user interactions with virtual space, map showings map features representing locations of the virtual space in terms of their respective forms, shapes, sizes, surrounding conditions, topography, spatial relationships, and/or other aspects associated with the map features may be implemented and presented to the user on client computing platform 104. In some examples, the map may show 2D or 3D concepts of such features using Cartesian coordinate system. Examples such features may include, but not limited to, towns, cities, castles, states, countries, nations, tribes, realms, kingdoms, rooms, regions, areas, planets, water bodies, stars, and/or any other types of locations in the virtual space; resource cores in the virtual space; locations having specific terrain types in the virtual space (e.g., specific forests, mountains, lakes, deserts and/or any other terrain types); infrastructures (e.g., roads, railroads, buildings, plantations, farms, watch towers, defensive towers, defensive works such as trenches, mines, walls and/or any other defensive works); virtual space characters, objects, or items corresponding to specific locations on the map (e.g., troops in a battle ground, user characters in an area, virtual items available at a location); and/or any other types of map features that may be shown on the map of virtual space. Such features shown on the map may be dense such that the map may show one or more features associated with individual locations in the virtual space; or may be sparse such that the map may show specific features associated with individual locations in the virtual space.

The map of the virtual space may be continuous, segmented, or hybrid of the two. In a continuous map, the user may navigate from point to point on the map continuously and/or may view any portions of the map by navigation. In a segmented map, nodal structure may be established such that the user may not view only one portion (e.g., a node) of the map at a given stage. In some examples, the map of virtual space may be a hybrid of the two modes such that a given stage, a portion of the virtual space map may be continuously presented the user.

In some implementations, the map of virtual space may be implemented using grid squares (e.g., tiles). This is generally referred to as a tile-based map system in the art. In such a system, features within the virtual space, including characters, may occupy individual grid square and in most cases are aligned on rigid X and Y axes that form the grid squares. The grids underlying the map may be abstracted into low-resolution grids (e.g. zoomed out view of the map) or magnified into high resolution grids (e.g., zoomed in view of the map).

In any case, the map component 112 may facilitate user interaction with the map of the virtual space. This may include enabling the user to zoom in or out of portions of the map, to view information regarding features shown on the map, to move field of view of the map for viewing different portions of the map (e.g., navigate the map), to change an orientation of the map, to change a viewing perspective of the map (e.g., bird's eye view or side view), to search for features on the map, to select feature density shown on the map, to select 2D or 3D viewing of the map, to initiate virtual space actions, to interact with other users in the virtual space, and/or any other user interactions with the map.

For facilitating such interaction of the user with the map, the map component 112 may generate a view of the map for presentation to the user on the client computing platform 104. Such a view of the map may correspond to a portion of the map; and may include a zoom ratio, a feature density level, a visibility, a dimensionality, a size, and/or any other feature parameters for adjusting the presentation of the features shown on the portion of the map, a point-of-view, an orientation, and/or other map view parameters. Such a view of the map may be presented on client computing platform 104 so that the user may observe a portion of map that falls within a field of the view of the map. As used herein, the field of view of the map is referred to as the observable portion of the map, e.g., as being presented on a display of the client computing platform 104. The field of view of the map may be characterized by aspect ratio associated with the display (e.g. 16:9, 4:3, 1:1 or any other aspect ratio), angle associated with the field of view with respect to an imaginary axel through the virtual space (e.g., 100 degree), linearity associated with the field of view (e.g., 100 feet per 1000 yard), and/or any other field of view characterization.

Figure 2:
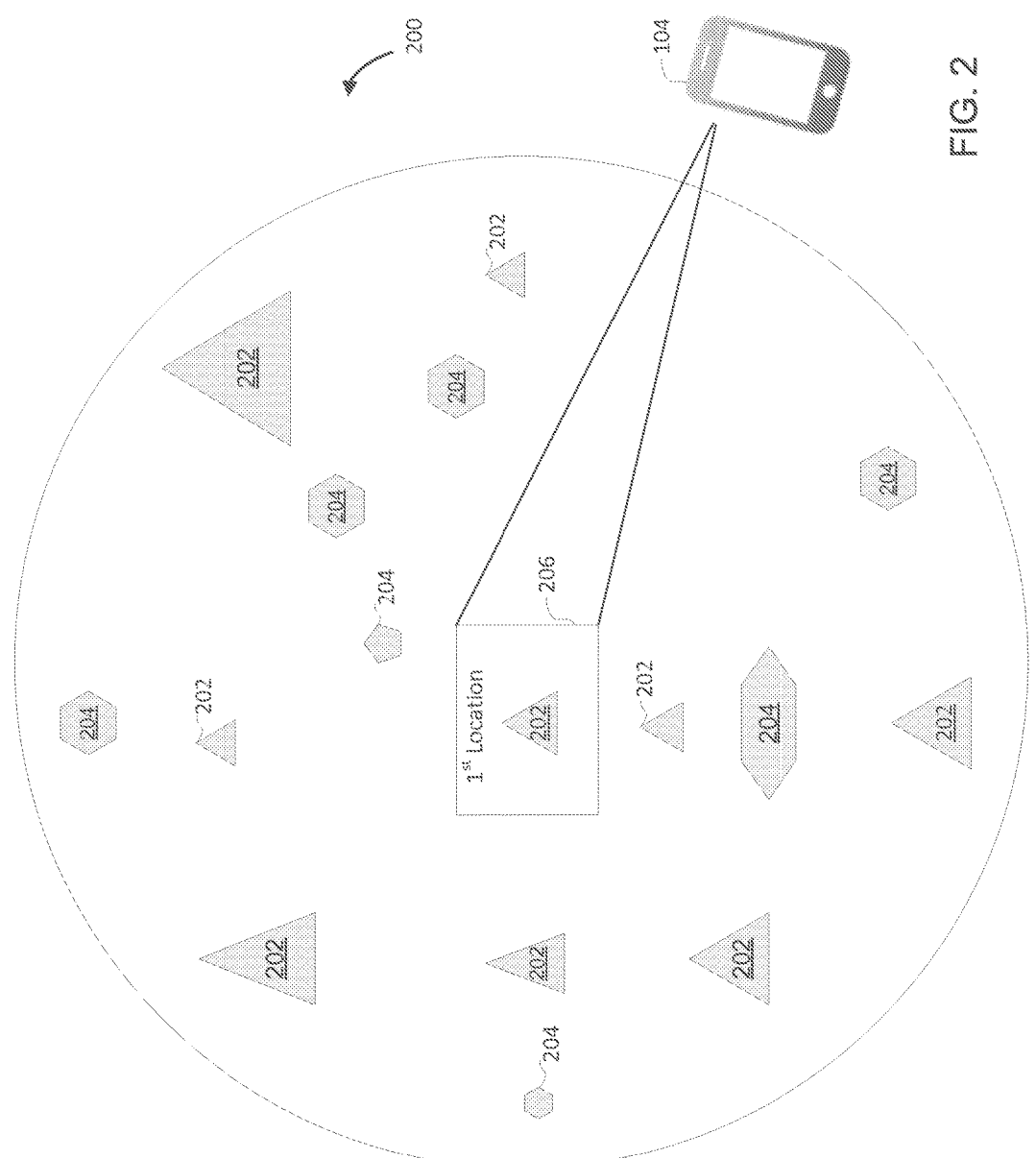
FIG. 2 depicts an example of a view of a map of a virtual space implemented by the system shown in FIG. 1.

As an illustration, FIG. 2 depicts an example of a view of a map of a virtual space implemented by the system shown in FIG. 1. It will be described with references to FIG. 1. As can be seen in FIG. 2, the map 200 of the virtual space may show various features, such as features 202, 204 and 206 illustrated in this example. In this example, features 202 represents user controlled cities and is depicted in triangular shape. It should be understood such depiction of features 202 in this examples is for illustration clarity such that they may be distinguished from other types of features also shown on map 200 in this example. As illustrated, the individual features 202 (e.g., user cities) are depicted in different sizes to reflect a level associated with features 202. Likewise, features 204 in this example represent various resource cores (e.g., gold mines) within the virtual space and are depicted as pentagons. The size of a given feature 204 in this example reflects a deposit level associated with the given feature 204. It should be understood although only two types of features are shown on the map 200 in this example, this is only for illustration clarity and thus not intended to be limiting. In some other examples, the map 200 may show more types of features than those shown in FIG. 2. For example, the map 200 may show infrastructures, objects, characters, buildings, troops, activities, and/or any other features within the virtual space.

In any case, as illustrated in FIG. 2, a field of view 206 of the map 200 may be presented to the user on client computing platform 104. As illustrated, the field of view 206 of the map may correspond to a portion of the map, which in turn corresponds to a location in the virtual space (e.g., the $1^{st}$ location as shown in this example). As shown, through the field of the view 206 of the map, the user may view or interact with features (e.g., feature 202 corresponding to the $1^{st}$ location as shown in this example) shown in the field of view 206.

Returning to FIG. 1, the direction control component 114 may be configured to receive control inputs provided by the user. The control inputs received by the direction control component 114 may indicate a direction in which the field of view of the map should be moved. As such, the direction indicated by the control inputs received the direction control component 114 may indicate a general position (e.g., such as a nadir or zenith in the virtual space) towards which the virtual space may be navigated by the user. The direction indicated by the control inputs received the direction control component 114 may include a specific position from which the direction is determined. For example, a given direction indicated by the received control input may indicate a northerly direction with respect to a reference virtual space location such that The control inputs may be provided by users using client computing platform 104 and/or control devices coupled to or associated with the client computing platform 104. For example, without limitation, the user may provide such control inputs through actions enabled by a mouse coupled to client computing platform 104 (e.g., mouse click or drag), a keyboard of the client computing platform 104 (e.g., entry of keys), gamepads directional control buttons, pointing device, finger swipe on a touch sensitive surface coupled to the client computing platform 104, stylus for a touch sensitive surface, speakers associated with client computing platform 104 for receiving voice control command, camera associated with client computing platform 104 for receiving gesture commands and/or any other types of control devices. Examples of the touch sensitive surface may include, but not limited to, a touch-enabled smart phone display, a tablet display, a touch pad, a touch-enabled desktop display, a touch-enabled smart TV, and/or any other types of touch sensitive surface.

In some implementations, the actions performed by the user for providing the directional control inputs through such control devices may cause the control devices to generate output signals, which may be transmitted to server 102 for a determination of the control inputs corresponding to the actions performed by the user. In those implementations, the output signals generated by a given control device may be characterized by various parameters, such as, but not limited to, mouse parameters, gesture parameters, voice control parameters, keyboard parameters, video parameters, photo parameters and/or any other output signal parameters by the given control device. As an illustration, the mouse parameters may include parameters that indicate the state of left/middle/right buttons of the mouse (e.g. pressed or released), a number of rotations by the mouse wheel, a movement of mouse along an X direction associated with the mouse, a movement of mouse along a Y direction associated with the mouse, and/or any other mouse parameters. As another illustration, the gesture parameters may include one or more directions, shapes, contact locations, a hold time, a sequence, and/or any other gesture parameters related to a gesture (e.g., finger swipe) made by the user on a touch sensitive surface.

Responsive to receiving such output signals generated by the control device, the direction control component 114 may analyze the received output signals for determinations the control inputs provided by the user. Such a determination may include a determination of directions in which the field of view of the map should move as indicated by the control inputs provided by the user. This may involve extracting the signal parameters described above. The extracted signal parameters may be compared with one or more predetermined control input definitions. The control input definitions may specify parameter values for one or more parameters defined by the control input definitions. The one or more parameters defined by the control input definitions may include a direction associated with the control input definition (e.g., left to right, right to left, top to bottom, bottom to top, diagonal and/or any other directions). Such control input definitions may be stored on the client computing platform 104, the electronic storage 110, the external resources 106, and/or any other storage locations; and may be made available for access for by the direction control component 114 via any suitable wired or wireless connections.

Programing rules or logic may be configured into direction control component 114 for the analysis of the received output signals based on the control input definitions. The analysis may include a comparison between the control input definitions and the information conveyed by the received output signals. Direction control component 114 may be configured to determine the parameter values for signal parameters of a current or previously performed action by the user through the control device. The determined parameter values may then be compared with the parameter values specified by the control input definition to determine whether the current or previously performed action matches one of the control input definitions. In some examples, such a comparison may include a determination whether an output signal parameter has breached a corresponding parameter value specified by a control input definition. For instance, in response to the received output signal parameters indicating that the user has swiped a finger across more than 5 adjacent pixels on a touch screen from left to right as specified a control input definition for left to right finger swipe, the direction control component 114 may determine that the user has achieved the left to right finger swipe on the touch screen. Responsive to such a determination, direction control component 114 may determine a direction indicated by the action performed by the user through the control device.

FIG. 3 illustrates one example of control inputs provided by a user through finger swipe on a touch sensitive surface employed by the system shown in FIG. 1. It will be described with references to FIGS. 1-2. As shown, the user may perform an action 302, e.g., a gesture action in this example in the field of view 206 shown in FIG. 2 on a touch sensitive surface included in client computing platform 104, e.g., a tablet computer in this example. As illustrated, the gesture action performed by the user may indicate various directions depending on the start and end positions of the gesture action performed by the user. The user may perform the action 302 to indicate the user would like to move the field of view 206 of the map in those directions. As shown, the action 302 may be transmitted to server 102 via output signals for a determination of a control input provided by the user. As described above, responsive to receiving the action 302, the server 102 may, for example via the direction control component 114 determine the control input provided by the user, which may include a determination of the direction indicated by the action 302.

The navigation mode component 116 may be configured to obtain selection and/or entry of a navigation mode by the user for implementation as a present navigation mode. The navigation mode obtained by the navigation mode component 116 may correspond to a manner of map navigating, e.g., changing the field of view of the map for presentation to the user. The obtained navigation mode may be associated with one or more navigation parameters, such as, but not limited to, the speed of navigation (e.g., quick navigation v.s. conventional navigation), specific types of map features to be shown, density level, display size, forms of representation (e.g. icon v.s. text), and/or any other aspects of the map features shown, a resolution of the map, and/or any other navigation parameters that may be associated with the navigation mode. In some implementations, the navigation mode component 116 may be configured to receive a presently selected navigation mode from a user interface implemented and presented on client computing platform 104. In those implementations, the user may select a navigation mode in such a user interface (e.g., a user settings interface, a map setting interface, a map interface and/or any other types of interfaces)

The navigation mode obtained by the navigation mode component 116 may include a first navigation mode. In the first navigation mode, the map may be navigated incrementally in response to directions indicated by the control inputs provide by the user, such as the control inputs received by the direction control component 114. For example, a user may provide a control input via a mouse drag on a display coupled to the client computing platform 104 associated with the user; and the control input provided by the user may indicate that the user would like navigate the map in a left to right direction. In that example, while the first navigation mode is selected by the user as obtained by the navigation mode component 116, the system 100 may "scroll" the field of the view of the map for presentation on the tablet computer 104 such that individual adjacent portions of the map may be moved into the field of the view continuously at the end of the control input (temporal) provided by the user.

The navigation mode in obtained by the navigation mode component 116 may include a second navigation mode. The second map navigation mode may be associated with a type of map features that the map navigation in the second navigation mode may be based on. That is, in response to a control input indicating a direction in which the map is to be navigated, the field of view of the map jumps, from a first map feature (e.g. a first location) on the map corresponding to the present field of view, to a second map feature (e.g., a second location) on the map corresponding to a map feature having the map feature type associated with the second navigation mode. Unlike in the first navigation mode, in the second navigation mode, such navigation of the map may not cause portions of the map between the first location and the second location to be moved into the field of the view continuously in a "scrolling manner", but rather "jump" the field of view of the map from the present field of view to a new field of view instantly or near-instantly. This may enhance usability of the online game as a user may navigate to a new location on the map quickly without having the portions of the map between the present location in the present field of view and the new location presented on client computing platform 104. This may enhance user experience in the online game as map features of interest to the user may be quickly moved into the field of view for presentation to the user in response to the control inputs provided by the user.

A given type of map features associated with the second navigation mode may be defined or specified by one or more map feature parameters, which may include, but not limited to, a location level threshold parameter, a user type parameter, a feature level threshold, a defense level threshold parameter, a size threshold parameter, a population threshold parameter, a resource threshold parameter for defining the map feature type, and/or any other map feature parameters. Such map feature parameters may be used to specify map features of interest to the user, which may include, but not limited to, cities, kingdoms, realms, towns, resource cores, rooms, fields, battle grounds, landmarks, planets, stars, oceanic locations and/or any other types of virtual space locations. By way of non-limiting example, a given user may use the map feature parameters to specify that the user is interested in navigating to level 10 cities controlled by the user.

The user type parameter may be used specify map features associated with a type of users of interest to the given user. The user type for such specification may include user type by a relationship with respect to the given user. The user type by a relationship may include, but not limited to, members of an alliance the given user belongs to, users that are engaging in a quest, mission, campaign or other activates with the given user in the virtual space, users that are engaging in battles, wars, or other conflict situations against the given user in the virtual space, users that are in cooperative relationships with the given user in the virtual space, users that are friends with the user in the virtual space and/or real-world, and any other user type by a relationship with respect to the given user. The user type for specification of the map feature type associated with the second navigation mode may include user type by user aspect, which may include, but not limited to, a user threshold level (e.g., users having user level 5 and above), a class, race, role (e.g., users assume the race of dwarf in the virtual space), a capability (e.g., users that have abilities to provide healings to troops), a virtual item (e.g., users that have acquired war chanting scroll in their inventories), a type of resources (e.g., users that have uranium), an amount and/or type of troops (e.g., users that have 500 elite infantrymen), and/or any other user aspects that may be associated with users for specification of the map feature type. By way of non-limiting examples, a given user may use the user type parameter to specify that the map features having the map feature type associated with the second navigation mode should include the map features associated with members of an alliance the given user belongs to; or should include the map features associated with level 10 and above users in the virtual space.

The location parameters may include a feature level parameter for specifying the map feature type associated with the second navigation mode. The feature level parameter may be used to specify a level associated with the type of features of interest to user. Such a feature level may reflect a status of a corresponding feature in the virtual space. By way of non-limiting example, the given user may use the location feature specify that the features having the map feature type associated with the second navigation mode should include the map features having a given level (e.g. level 10 cities controlled by the given user).

The location parameters may include threshold parameters for specifying the type of map features associated with the map. Such threshold parameters may include a defense level threshold parameter, a size threshold parameter, a population threshold parameter, a resource threshold parameter, a production threshold parameter, a troop threshold parameter, and/or any other threshold parameters for specifying the map feature type associated with the second navigation mode. Such threshold parameters may specify a minimum or a maximum level of the corresponding feature aspects associated with the map features of interest to the given user. For example, the defense level threshold parameter may be used by the given user to specify a minimum or maximum level of defense associated with map features that are of interest to the given user (e.g., defense level 10 or above cities controlled by users that are in alliance opposing to the user); the population threshold parameter may be used by the given user to specify a minimum or maximum level of a population associated with map features of interest to the user (e.g., user controlled cities have population size 12 or above); the size threshold parameter be used by the given user to specify a minimum or maximum level of size of the map features of interest to the given user in the virtual space (e.g., size 6 or above cities controlled by the given user); the resource threshold parameter may be used to specify a minimum or maximum level of resources associated with the map features of interest to the given user (e.g., user controlled gold mine that have at least 50,000 gold deposit t available for mining); the production threshold parameter may be used to specify a minimum or maximum level of production associated with the map features of interest to the given user (e.g., user controlled cities that have 30 or above production output per turn); a troop threshold parameter may be used to specify a minimum or maximum level of troops associated with map features of interest to the given user (e.g., enemy user controlled cities that have at most 5 troops defending the cities); and/or any other examples of the threshold parameters.

In some implementations, the navigation mode component 116 may be configured to facilitate users to provide the map feature type to be associated with the second navigation mode through a user interfaces implemented on the client computing platform 104. Such a user interface may include, graphical user interfaces, voice interfaces, gesture interfaces, and/or any other type of user interfaces. For example, the navigation mode component 116 may be configured to generate graphical user interface information for presentation and implementation on the client computing platform 104. Through such graphical user interface, the given user may provide values for one or more the map feature parameters for specification of the map feature type associated with the second navigation mode.

FIG. 4 illustrates one example a user interface for specifying a map feature type for association with the navigation mode. It will be described with references to FIG. 1. As illustrated, user graphical information may be generated by server 102, for example via the navigation mode component 116 for presenting a graphical user interface 400 on a client computing platform 104. As shown, the user interface 400 may comprise control fields for a given user to specify one or more map feature type 402. In this example, as shown, the map feature type may be specified by the given user by providing values to feature type parameters such as the a location parameter 402*a*, a user type parameter 402*b*, a location level threshold 402*b*, a defense level threshold 402*c* and any other map feature parameters. As shown, the interface 400 may include a control field enabling the given user to select a specified map feature type 402 to be associated with the second navigation mode. In this example, as shown the user selects the first map feature type shown in interface 400 to be associated with the second navigation mode, which indicates that the user is interested in navigating to cites controlled by members of alliance Y that has a defense level above level 3. It should be understood FIG. 4 is merely illustrative and thus not intended to be limiting. In some other examples, the map feature parameters that may be included in an interface for specifying the map feature type for association with the second navigation mode may be more or less than those shown in this example.

Returning to FIG. 1, in some examples, the navigation mode component 116 may be configured to determine a number of map feature parameters available to the user for the user to specify the map feature type associated with the second navigation mode in the user graphical interface, such as the graphical user interface 400 shown in FIG. 4. Such a determination by the navigation mode component 116 may be based on based on various user aspects, such as, but not limited to, the user level in the virtual space, experiences, mission completed, a number of monster killed, a role or a class of the user, one or more virtual items associated with the user, and/or any user aspects. For example, the navigation mode component 116 may determine that up to 2 feature parameters may be available to the user for specifying the map feature type associated with the second navigation mode (e.g., location and user type) in the graphical user interface when the user is at level 1-5; and up to 4 feature parameters (e.g., location and user type, size and defense threshold) may be available to the user when the user is at level 5-10. In this way, as the user progresses in the virtual space, the user may be enabled to navigate to map features of interest in the second navigation mode with more specificity (e.g., more precise navigation in the second navigation mode). This may incentivize user progression in the virtual space and as well as enhance user experiences in the virtual space.

In some implementations, the navigation mode component 116 may be configured to facilitate an offer of one or more feature parameters to the user in exchange for virtual consideration in graphical user interface, such as the graphical user interface 400 shown in FIG. 4. For example, the navigation mode component 116 may facilitate presentation of offers of a number of feature parameters to the user in exchange, for example for an amount of virtual currencies (e.g., gems), real-world money credits, and/or any other types of virtual consideration from the user. As an illustration, in one example, the navigation mode component 116 facilitates an offer to the user of up to 5 specific location parameters (e.g., user, location type, size, population and defense threshold) for specifying the map feature type associated with the second navigation mode in the graphical user interface for an amount of real world money credit (e.g. $4.99). In that example, upon the user acceptance of such an offer, the navigation mode component 116 may effectuate these location parameters to be presented in the graphical user interface as available parameters (e.g., from inactive field to activate field) for the user to provide parameter values for these parameters.

The field of view determination component 118 may be configured to determine a field of view of the map for the user in response to a control input provided by the user indicating a direction in which the field of view should be moved. To achieve this, the field of view determination component 118 may obtain a current location on the map where the present field of view is taken, a present navigation mode selected by the user, and/or any other information. The current location on the map where present field of view is taken may be obtained from the map component 112 component. The present navigation mode selected by the user may be obtained from the navigation mode component 116. The determination of the new field of the view by the field of view determination component 118 may include a determination of a new location where the new field of view should be taken on the map. The determination of such a new location may be based on the current location where the present of view is taken, the control input provided by the user, the navigation mode selected by the user and/or any other parameters. When the first navigation is selected by the user, the field of view determination component 118 may determine the new location by calculating a displacement in the virtual space based on the control input. Based on the calculated displacement, the relative position of the new location where the new field of view should be taken with respect to the present location corresponding to the present field of view may be determined.

When the second navigation mode is selected by the user, for determining the new field of view, the field of view determination component 118 may first compose a query for acquiring map features that are of interest to the user as indicated by the map feature type associated with the second navigation mode. In some examples, the field of view determination component 118 may effectuate execution of such a query via a virtual space location database(s) employed by the system 100 (not shown in this example for clarity) or provided by a third entity associated with the provider of the system 100. The query may be based on the map feature type associated with the second navigation mode as specified by the user, for example via a graphical user interface such as the graphical user interface 400 shown in FIG. 4. For instance, a SQL select query may be composed by the field of view determination component 118 to select map features based on values of map feature parameters that define the map feature type associated with the second navigation mode. By way of non-limiting example, the following illustrates an example of such a query select all cities from location database where the city defense level>defense 10 and the city occupier=a member of Alliance A, and where the cite lies to the east of the current virtual space location at which the view is taken Upon receiving a result set or results a query (e.g., from the virtual space location database), field of view determination component 118 may be configured to parse the result set(s). The obtained result set(s) may include locations shown as map features having the map feature type associated with the second navigation mode. In some examples, such locations included in the result set(s) may be represented by coordinate information indicating coordinates of those locations on the map shown as the map features having the map feature type associated with the second navigation mode. In some implementations, the field of view determination component 118 may be configured to select a location corresponding to a first map feature shown on the map from the result set(s). The field of view determination component 118 may select the first map feature because the first map feature is closer to the current location where the present field of view is taken in the direction indicated by the control input than any other map features included in the result set(s), i.e., other map features having the map feature type. By way of non-limiting example, the above described query may return 5 such cities in a result set, and field of view determination component 118 may select one city from these 5 cities that is closest to the current location where the present field of view is taken. In some implementations, such a selection by the field of view determination component 118 may be based on coordinate information of the current location where the present field of view is taken and coordinate information of the locations included in the result set(s).

As an illustration, FIG. 5 depicts one example of determining a new location on the map where the present field of view should move to in response to a control input provided by the user in the second navigation mode. It will be described with references to FIG. 1. As shown in this example, the server 102 may make determination 504 based on information 502. As shown, the information 502 may include information indicating a direction of a control input provided by the user; information indicating a current location where the present field of view is taken; information indicating a navigation mode selected by the user; information indicating map feature type associated with the second navigation mode as specified by the user if the second navigation mode is selected. As illustrated in this example, the determination 504 may be made based on the information 502 such that the new location for the new field of view may be the location that is closest to the current location where the present of view is taken in accordance with the information 502. In this example, as shown, the selected location is the level 3 city that is closest to the current location wherein the present field of view (e.g., the $1^{st}$ location) to the south of the current location.

Figure 6:
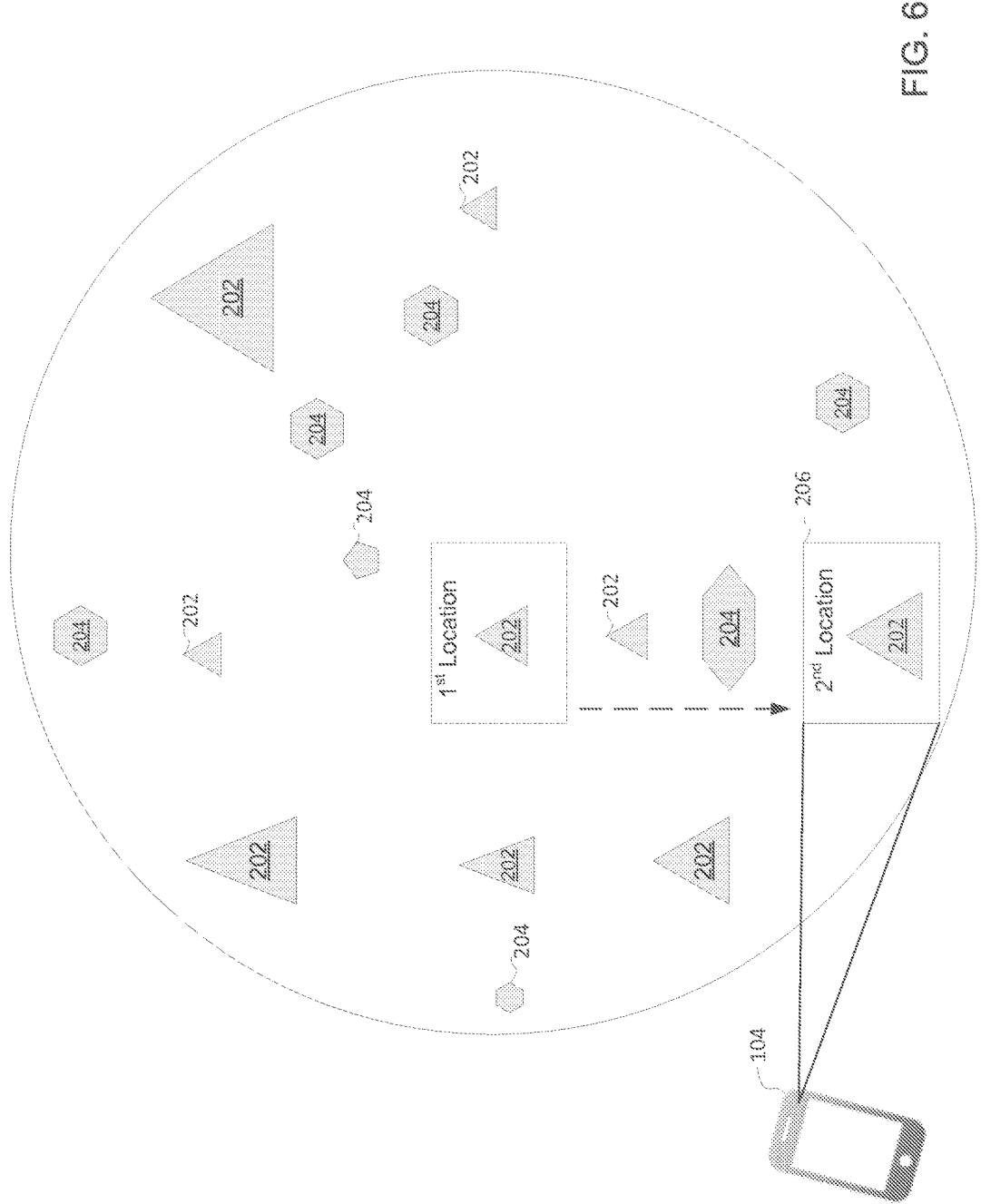
FIG. 6 illustrates one example of jumping the field of view while the second navigation mode is selected.

FIG. 6 illustrates one example of jumping the field of view while the second navigation mode is selected. It will be described with references to FIGS. 1-2 and 5. As shown, in response to the determination of a new location for the new field of view as described in FIG. 5, the system shown in FIG. 1 may implement the new field of view 206 on the client computing platform 104 such that the present field of view 206 jumps from e.g., the $1^{st}$ location as shown in this example to the new location e.g., the second location as determined by determination 504 shown in FIG. 5. It should be noted that between the first and second location on the map, there is another triangle 202 representing a city controlled by an alliance member Y on the map. However, this city is not selected for navigation in the second navigation mode because this city does not satisfy the map feature type associated with the second navigation mode (i.e. the level of this city is less than level three as indicated by its size shown on the map). In this manner, the user may be presented the new location in the field of view 206 while the second navigation mode is selected as soon as the user provides a control input indicating a direction in which the field of view should be moved.

Returning to FIG. 1, in some implementations, the field of view determination component 118 may be configured to obtain a reference location from which the navigation of the map in the second navigation mode may be initiated. By default, such as reference location may be the current location of the present field of view as described in FIG. 6. In those implementations, the field of view determination component 118 may obtain a value for the reference location (e.g., as specified by the user through map setting configurations enabled by a map setting interface) indicating where the navigation of the map should start in the second navigation mode. For example, the reference location obtained by the field of view determination component 118 include a home base of the user; and, at a first given time, the user may navigate eastly from the home base to a first city controlled by the user; and at a second given time, while the current view presenting the first city on the map to the user, the user may navigate southerly from the home base to a second city controlled by the user such that the second city may be presented to the user in the present field of view.

In some exemplary implementations, the field of view determination component 118 may be configured to determine a level of accuracy of the new location to be presented in the present field of view in the second navigation mode. For example, a level 1 accuracy determined by the field of view determination component 118 may be such that 50% of time the present field of view determined by the present field of view determination component 118 while in the second navigation mode may be within a first degree of inaccuracy; a level 2 of accuracy may be such that the 40% of time the present field of view determination component 118 may be in accurate within a second degree of inaccuracy less than the first degree of inaccuracy; a level 3 of accuracy may be such that the 30% of time the present field of view determination component 118 may be in accurate within a $3^{rd}$ degree inaccuracy less than the first degree or second degree of inaccuracy and so on.

In some exemplary implementations, the field of view determination component 118 may be configured to exhaust an amount of resource in a user's inventory for determination of present field of view in the second navigation mode. For example, it may be predetermined by the provider, administrator, moderator, and/or any other entities related to the online game such that the determination of the present field of view in the second navigation mode by the field of view determination component 118 may exhaust an amount of gold, coal, lumber, stone and/or any other types of resources in the user's inventory. That is, in those exemplary implementations, it may be predetermined that navigating the map in the second navigation mode will cost resources to the user.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118. Processor 108 may be configured to execute components 112, 114, 116, 118 by software; hardware; firmware; some combination of software, hardware, and/or firmware; and/or other mechanisms for configuring processing capabilities on processor 108.

It should be appreciated that although components 112, 114, 116, 118 are illustrated in FIG. 1 as being co-located within a single processing unit, in implementations in which processor 108 includes multiple processing units, one or more of components 112, 114, 116, 118 may be located remotely from the other components. The description of the functionality provided by the different components 112, 114, 116, 118 described below is for illustrative purposes, and is not intended to be limiting, as any of components 112, 114, 116, 118 may provide more or less functionality than is described. For example, one or more of components 112, 114, 116, 118 may be eliminated, and some or all of its functionality may be provided by other ones of components 112, 114, 116, 118. As another example, processor 108 may be configured to execute one or more additional components that may perform some or all of the functionality attributed below to one of components 112, 114, 116, 118.

Figure 7:
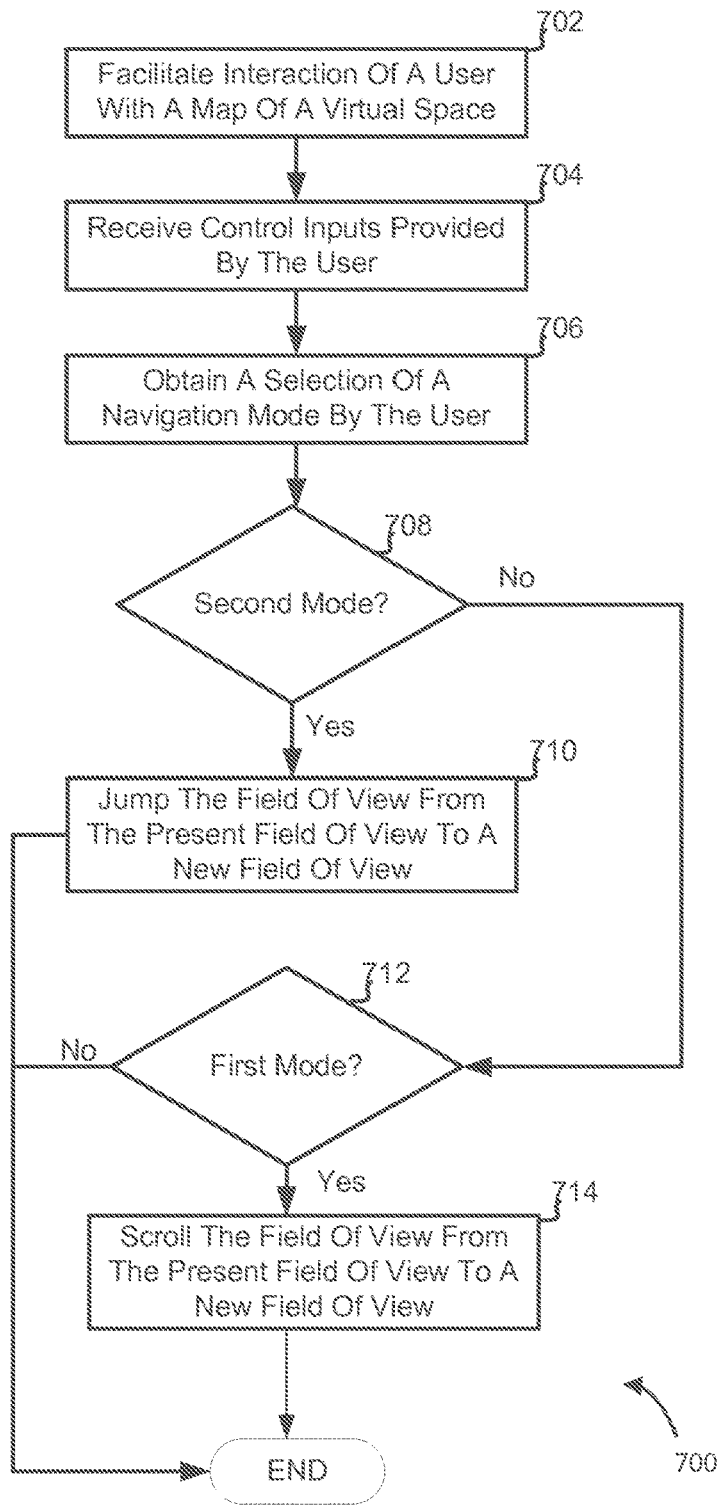
FIG. 7 illustrates one exemplary method for facilitating navigation of a map of a virtual space in accordance with the disclosure.

FIG. 7 illustrates one exemplary method 700 for facilitating navigation of a map of a virtual space in accordance with the disclosure. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, interaction of a user with a map of a virtual space may be facilitated. In some implementations, operation 702 may be performed by a space component the same as or similar to space component 112 (shown in FIG. 1 and described herein). The map may show map features representing locations of the virtual space in terms of their respective forms, shapes, sizes, surrounding conditions, topography, spatial relationships, and/or other aspects associated with the map features. In some examples, the map may show 2D or 3D concepts of such map features using Cartesian coordinate system. The user interaction with the map as facilitated in operation 702 may include enabling zooming in or out of portions of the map, viewing information regarding features shown on the map, moving field of view of the map for viewing different portions of the map (e.g., navigate the map), changing an orientation of the map, to change a viewing perspective of the map (e.g., bird's eye view or side view), searching for features on the map, to select feature density shown on the map, selecting 2D or 3D viewing of the map, initiating virtual space actions to on the features shown on the map, interacting with other users in the virtual space on through the map, and/or any other user interactions with the map. In some implementations, operation 702 may be performed by a map component the same as or similar to map component 112 (shown in FIG. 1 and described herein).

At an operation 704, a control input provided by the user indicating a direction in which a present field of view of the map should be moved may be received. In some implementations, operation 704 may be performed by a direction control component the same as or similar to direction control component 114 (shown in FIG. 1 and described herein).

At operation 706, a navigation mode selected by the user may be obtained. The navigation mode obtained in operation 706 may correspond to a manner of map navigating, e.g., changing the field of view of the map for presentation to the user. The obtained navigation mode obtained may include a first navigation mode. In the first navigation mode, the map may be navigated incrementally in response to directions indicated by the control inputs provide by the user. The obtained navigation mode may include a second navigation mode. The second map navigation mode may be associated with a type of map features on which the map navigation in the second navigation mode may be based. In the second navigation mode, the field of view of the map may be "jumped" from the present field of view to a new field of view instantly or near-instantly. A given type of map features associated with the second navigation mode may be defined or specified by one or more map feature parameters, which may include, but not limited to, a location level threshold parameter, a user type parameter, a feature level threshold, a defense level threshold parameter, a size threshold parameter, a population threshold parameter, a resource threshold parameter for defining the map feature type, and/or any other map feature parameters. The location parameter may be used to specify map features corresponding to a location type of interest to the user, which may include, but not limited to, cities, kingdoms, realms, towns, resource cores, rooms, fields, battle grounds, landmarks, planets, stars, oceanic locations and/or any other types of virtual space locations. In some implementations, operation 706 may be performed by a navigation mode component the same as or similar to user component navigation mode component 116 (shown in FIG. 1 and described herein).

At an operation 708, a determination whether the navigation mode obtained in operation 706 may be made. In cases where the navigation mode obtained in operation 708 is the second navigation mode, the method proceeds to operation 710; and in cases where the navigation mode obtained in operation 708 is not the second navigation mode, the method proceeds to operation 712. In some implementations, operation 708 may be performed by a navigation mode component the same as or similar to navigation mode component 116 (shown in FIG. 1 and described herein).

At an operation 710, a field of view of the map may be determined in the second navigation mode for presentation to the user such that the field of view jumps from the present field of view to the new field of view. The determination made in operation 710 may be based on the current location where the present field of view is taken, the control input provided by the user in operation 704, the map feature type associated with the second navigation mode and/or any other parameters. The determination made in operation 710 may select a first map feature because the first map feature is closer to the current location where the present field of view is taken in the direction indicated by the control input than any other map features having the map feature type associated with the second navigation mode. In some implementations, operation 710 may be performed by field of view determination component the same as or similar to field of view determination component 118 (shown in FIG. 1 and described herein).

At an operation 712, a field of view of the map may be determined in the first navigation mode for presentation to the user such that the field of view s from the present field of view to the new field of view. In cases where the navigation mode obtained in operation 708 is the first navigation mode, the method proceeds to operation 714; and in cases where the navigation mode obtained in operation 708 is not the second navigation mode, the method proceeds end. In some implementations, operation 712 may be performed by a navigation mode component the same as or similar to navigation mode component 116 (shown in FIG. 1 and described herein).

At an operation 714, a field of view of the map may be determined in the second navigation mode for presentation to the user such that the field of view scrolls from the present field of view to the new field of view. In the first navigation mode, the map may be navigated incrementally, i.e., scrolled in response to directions indicated by the control inputs provide by the user in operation 708. In some implementations, operation 714 may be performed by field of view determination component the same as or similar to field of view determination component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating map navigation of an online game, the system comprising
    one or more processors configured by computer readable instructions to:
        facilitate interaction of a user with a map of a virtual space having a geography by generating a view of the map for presentation to the user, the view presented to the user including a portion of the map that falls within a field of view;
        receive control inputs provided by the user indicating a direction in which the field of view of the map should be moved;
        obtain selection and/or entry of a navigation mode by the user for implementation as a present navigation mode; and
        determine a present field of view of the map for the user such that while the selected navigation mode is a second navigation mode, in response to reception of a control input from the user indicating the field of view of the map should be moved in a first direction, the field of view jumps from the present field of view to a new field of view that encompasses a first map feature of a map feature type associated with the second navigation mode because the first map feature is closer to the present field of view in the first direction than any other map feature of the first map feature type, wherein map features represent features present at geographic locations in the virtual space corresponding to positions of the map features in the map, and wherein the features represented by the map features are observable in the virtual space independent from the map.

2. The system of claim 1, wherein the map feature type associated with the second navigation mode is defined by one or more map feature parameters, the one or more map feature parameters including a location level threshold parameter, a user type parameter, a defense level threshold parameter, a size threshold parameter, a population threshold parameter, and/or a resource threshold parameter for defining the map feature type.

3. The system of claim 2, wherein the one or more processors are further configured by the computer readable instructions such that obtaining the navigation mode includes facilitating the user to specify the map feature type associated with the second navigation mode through a graphical user interface implemented on a client computing platform associated with the user by providing values for the map feature parameters.

4. The system of claim 3, wherein facilitating the user to specify the first map feature type through the graphical user interface includes determining a number of map feature parameters available to the user for the user to specify the map feature type associated with the second navigation mode in the graphical user interface.

5. The system of claim 4, wherein the determination of a number of map feature parameters presented to the user in the user graphical user interface for specifying the map feature type associated with the second navigation mode is based on a level, a class, a role of the user within the virtual space, and/or one or more virtual items associated with the user.

6. The system of claim 4, wherein facilitating the user to specify the first map feature type through the graphical user interface further includes presenting an offer of one or more map feature parameters for purchase by the user in the graphical user interface, wherein the determination of the number of map feature parameters presented to the user in the user graphical user interface for specifying the first map feature type is based on a number of map feature parameters purchased by the user.

7. The system of claim 1, wherein the one or more processors are further configured by the computer readable instructions such that the received control inputs include gesture inputs provided by the user on a touch sensitive surface coupled to or included in a client computing platform associated with the user.

8. The system of claim 1, wherein the one or more processors are further configured by the computer readable instructions such that obtaining the selection and/or entry of the navigation mode by the user is based on a level, a class, a role of the user within the virtual space, and/or one or more virtual items associated with the user.

9. The system of claim 1, wherein the one or more processors are further configured by computer readable instructions such that the determination of the present field of view while the selected navigation mode is the second navigation mode exhausts an amount of resources associated with the user in the online game.

10. A method for facilitating map navigation of an online game, the method being implemented in one or more physical processors configured by computer readable instructions, the method comprising:
    facilitating interaction of a user with a map of a virtual space having a geography by generating a view of the map for presentation to the user, the view presented to the user including a portion of the map that falls within a field of view;
    receiving control inputs provided by the user indicating a direction in which the field of view of the map should be moved;
    obtaining selection and/or entry of a navigation mode by the user for implementation as a present navigation mode; and
    determining a present field of view of the map for the user, such that while the selected navigation mode is a second navigation mode, in response to reception of a control input from the user indicating the field of view of the map should be moved in a first direction, the field of view jumps from the present field of view to a new field of view that encompasses a first map feature of a map feature type associated with the second navigation mode because the first map feature is closer to the present field of view in the first direction than any other map feature of the first map feature type, wherein map features represent features present at geographic locations in the virtual space corresponding to positions of the map features in the map, and wherein the features represented by the map features are observable in the virtual space independent from the map.

11. The method of claim 10, wherein the map feature type associated with the second navigation mode is defined by one or more map feature parameters, the one or more map feature parameters including a location level threshold parameter, a user type parameter, a defense level threshold parameter, a size threshold parameter, a population threshold parameter, and/or a resource threshold parameter for defining the map feature type.

12. The method of claim 11, wherein obtaining the navigation mode includes facilitating the user to specify the map feature type associated with the second navigation mode through a graphical user interface implemented on a client computing platform associated with the user by providing values for the map feature parameters.

13. The method of claim 12, wherein facilitating the user to specify the first map feature type through the graphical user interface includes determining a number of map feature parameters available to the user for the user to specify the map feature type associated with the second navigation mode in the graphical user interface.

14. The method of claim 13, wherein the determination of a number of map feature parameters presented to the user in the user graphical user interface for specifying the map feature type associated with the second navigation mode is based on a level, a class, a role of the user within the virtual space, and/or one or more virtual items associated with the user.

15. The method of claim 14, wherein facilitating the user to specify the first map feature type through the graphical user interface further includes presenting an offer of one or more map feature parameters for purchase by the user in the graphical user interface, wherein the determination of the number of map feature parameters presented to the user in the user graphical user interface for specifying the first map feature type is based on a number of map feature parameters purchased by the user.

16. The method of claim 10, wherein the received control inputs include gesture inputs provided by the user on a touch sensitive surface coupled to or included in a client computing platform associated with the user.

17. The method of claim 10, wherein obtaining the selection and/or entry of the navigation mode by the user is based on a level, a class, a role of the user within the virtual space, and/or one or more virtual items associated with the user.

18. The method of claim 10, wherein the determination of the present field of view while the selected navigation mode is the second navigation mode exhausts an amount of resources associated with the user in the online game.

* * * * *